United States Patent

Becker

[11] 4,036,565
[45] July 19, 1977

[54] PUMP CONSTRUCTION

[75] Inventor: Willi Becker, Braunfels, Germany

[73] Assignee: Balzers Patent und Beteiligungs AG, Liechtenstein

[21] Appl. No.: 615,342

[22] Filed: Sept. 22, 1975

[30] Foreign Application Priority Data

Sept. 27, 1974 Switzerland .................. 13132/74

[51] Int. Cl.² .................................... F04C 17/00
[52] U.S. Cl. .................................. 417/420; 417/424;
 417/353; 417/360; 308/10; 310/67 R; 415/90
[58] Field of Search ............... 417/353, 420, 354, 360, 417/424; 415/90; 308/10; 310/67

[56] References Cited

U.S. PATENT DOCUMENTS

| | | | |
|---|---|---|---|
| 3,107,310 | 10/1963 | Carriere et al. | 308/10 |
| 3,168,977 | 2/1965 | Garnier et al. | 417/424 |
| 3,243,238 | 3/1966 | Lyman | 308/10 |
| 3,614,181 | 10/1971 | Meeks | 308/10 |
| 3,628,894 | 12/1971 | Ferguson, Jr. | 417/353 |
| 3,650,581 | 3/1972 | Boden et al. | 308/10 |
| 3,731,984 | 5/1973 | Habermann | 308/10 |
| 3,747,998 | 7/1973 | Klein et al. | 308/10 |
| 3,749,528 | 7/1973 | Rousseau | 308/10 |
| 3,860,300 | 1/1975 | Lyman | 308/10 |
| 3,933,416 | 1/1976 | Donelian | 417/354 |

Primary Examiner—C. J. Husar
Attorney, Agent, or Firm—McGlew and Tuttle

[57] ABSTRACT

A pump, particularly a turbo vacuum pump, comprises a housing having an intake and an exhaust spaced from the intake. The respective ends of the housing are provided with bearing bushes which extend in respective opposite directions and support a pump rotor in a manner to permit it to have some axial and radial play. A first magnetic system acts on the rotor and stabilizes the rotor axially in respect to the bearings and a second magnetic system acts on the rotor and stabilizes the rotor radially in respect to the bearings. The second magnetic system includes at least one permanent magnet which is fixed to the casing and faces either soft iron or permanent magnet portions provided on the rotor. An electromotor is mounted within the casing and the coil of the electrodynamic system and the stator of the drive motor are assembled to a subassembly which can be mounted or dismounted from the pump casing in a simple manner without interfering with the rotor or the stator. The magnetic centering system includes a permanent magnet which produces a magnetic field of an electrodynamic system which is secured to the inner surface of a pot-shape yoke having a central core pin. The motor is of known construction but without a commutator and it is equipped with permanent magnets and designed as an outside rotor which is mechanically connected to the pot-shape yoke and which carries permanent magnets on its inside.

8 Claims, 1 Drawing Figure

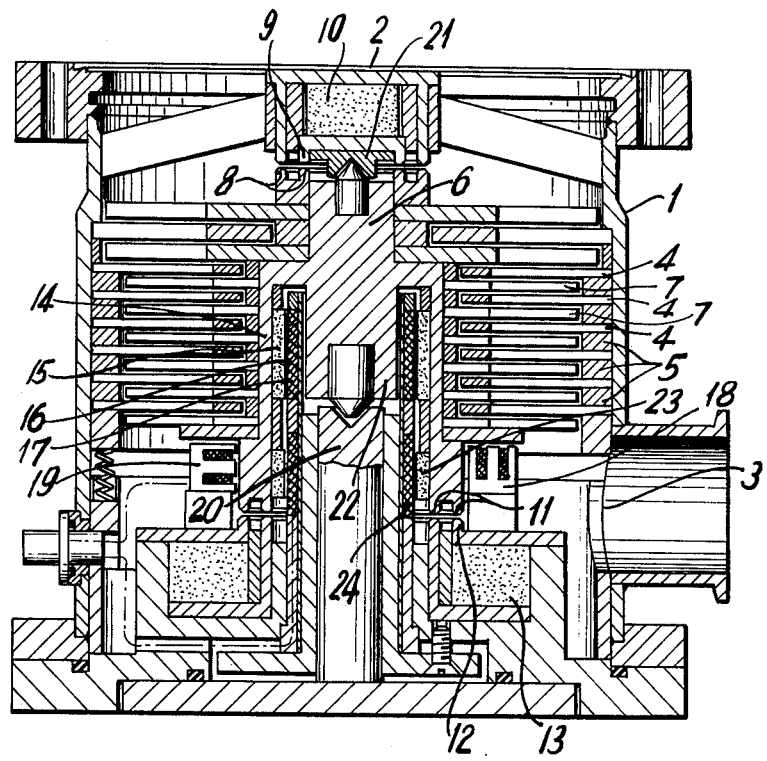

PUMP CONSTRUCTION

FIELD AND BACKGROUND OF THE INVENTION

This invention relates in general to the construction of pumps and, in particular, to a new and useful turbo vacuum pump which comprises a magnetically mounted rotor with the mounting being effected by means of at least one active magnetic system controlled through sensors.

DESCRIPTION OF THE PRIOR ART

As is well-known, the number of degrees of freedom to be fixed for a rotor is five. Magnetic mountings of rotors are known which are ferromagnetic, at least by sectors, by which all degrees of freedom are fixed through suitable sensors and electromagnets as adjusting members. Such solutions are very expensive in view of control system needed which requires electronic circuits.

Also known are magnetic mountings by which two degrees of freedom are fixed simultaneously. While using an appropriate arrangement of permanent or electromagnets, a stable radial mounting can be obtained. However, experience has shown that such mountings have a destabilizing effect in the axial direction and particular control devices become necessary for restoring the axial stability.

Further known is a contactless, axially stabilized and radially centered mounting of a rotating shaft which comprises radially centered bearings associated with each end of the shaft and which operates under the influence of magnetic forces. An electromagnetic servo-control mechanism for the axial stabilization is included. While applying such a mounting to uniflow turbo vacuum pumps, however, difficulties arise as to the dismounting operation in cases where the electromagnetic servo-control mechanism is provided at one side of the rotor in order to avoid a location of coils in the high vacuum.

SUMMARY OF THE INVENTION

The present invention is directed to a turbo vacuum pump having a magnetically mounted rotor in which no coils and electrical lead-ins at the intake side are needed. The intake cross-sectional area is not notably reduced, and the cost for control and adjusting members is small. The construction, nevertheless, makes it possible to provide an axially stable mounting which is free from transverse forces and which can be readily disassembled from the housing of the pump.

In accordance with the invention, a turbo vacuum pump is provided which comprises a stator mounted in a cylindrical casing having an intake and an exhaust opening. A rotor is mounted at its respective ends in bearing means which includes one magnetic system for controlling the axial positioning of the rotor and another magnetic system for controlling the radial position thereof. The means for axially mounting the rotor comprises an electrodynamic system disposed at the exhaust side of the pump and including a permanent magnet arrangement which is secured to the rotor and produces a substantially radial field and is also provided with a coil which is concentric of the axis and immersed into the permanent magnet arrangement. The axial stabilization of the position by means of a ring coil in a radial magnetic field is based on the fact that the force vector is perpendicular to the direction of the current in the coil and perpendicular to the magnetic field. Consequently, the force is exerted in a direction in which an unimpeded relative motion between the magnetic system and the coil is possible.

With the reversal of the direction of current, the force direction is also reversed. In the inventive pump, in which the current carrying coil is fixed to the casing and the magnet arrangement producing the radial field and connected to the rotor, is movable in the axial direction; the electrodynamic force is used for exposing the rotor to an axial directional force corresponding to the direction of the current in the coil without exerting disturbing radial forces. The rotation of the magnetic arrangement has no influence on the electrodynamic force acting in the axial direction.

A particular advantage of the invention is the possibility of assembling the coil of the electrodynamic system and the stator of the drive motor, which is mounted within the casing of the pump to a subassembly, so that the subassembly can be mounted and dismounted from the pump casing without interfering with the rotor or stator of the pump. The construction has the further advantage that no coil is needed at the intake side of the pump.

With purely magnetically suspended rotors of turbo vacuum pumps where four or five digrees of freedom to be checked are fixed by means of passive mounting elements, it is advantageous to use knife-edge bearings which are known per se. The five degrees of freedom referred to include the freedom motion about the X, Y and Z coordinates and in addition the freedom in respect to direction which includes angle of elevation and azimuth. Such bearings have the advantage of permitting relatively short shaft constructions for the pump and the polar moment of inertia may be large relative to the other main moments of inertia. Due to such a system of mounting, which includes a knife edge bearing at the intake and exhaust sides and an electrodynamic control element for the axial control system, the rotor can be held in place in any axial position within the play of the knife edges. The axial position is measured by a sensor and the signal produced by the measurement is compared with a required value and the magnetic field adjusted accordingly. The error signal is amplified and supplied to the coil of the electrodynamic system to make the adjustment.

A further development of the invention is directed to a turbo vacuum pump which is capable of operating with an as low as possible energy consumption of the control element for the axial stabilization. For this purpose, preferably, the inventive pump is designed so that fixed passive bearing elements provided at the intake and the exhaust side and comprising permanent magnets and an iron yoke hold the rotor shaft. The rotor shaft in this section is a ferromagnetic member or a permanent magnet so that the rotor shaft is held in a stable radial position while the permanent magnets exert an axial pull on the shaft. Such an arrangement possesses a point of labile equilibrium in the axial direction. As soon as the rotor is held in place at the equilibrium point by the electrodynamic control element provided at the exhaust side of the pump, a minimum energy consumption for the axial stabilization is obtained.

Accordingly, it is an object of the invention to provide a turbo vacuum pump which includes a stator mounted in a cylindrical casing which has an intake at one end and an exhaust adjacent the opposite end and which includes a rotor within the casing which is mounted on means for effecting its radial centering and separate means for effecting its axial centering, and wherein, means for effecting the axial centering comprises an electrodynamic system which is disposed at the exhaust side of the pump and includes a permanent magnet arrangement which is secured to the rotor and produces a substantially radial field, and which has a coil which is concentric to the rotor axis and which is immersed in a permanent magnet arrangement.

A further object of the invention is to provide a turbo vacuum pump which includes a coil of an electrodynamic system for regulating the axial positioning of the rotor which is connected together with the stator of a drive motor and assembled in a subassembly which is mounted within a pump casing without interfering with the rotor or stator of the pump.

A further object of the invention is to provide a turbo vacuum pump which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

The only FIGURE of the drawing is an axial sectional view of a turbo vacuum pump constructed in accordance with the invention.

DESCRIPTION OF THE PREFERRED EMBODIMENT

Referring to the drawing in particular, the invention embodied therein, comprises a turbo pump which includes a cylindrical casing 1, having an intake opening 2 adjacent its one end and an exhaust opening 3 adjacent its opposite end. The stator of the pump which is secured to casing 1 includes guide wheels 4 carrying blade rings and which are held in spaced axial position by spacer rings. 5. The rotor includes a shaft 6 and rotor wheels 7 which carry blade rings. The rotor and stator form a pumping system for evacuating areas or producing a vacuum.

In accordance with the invention, a ferromagnetic pole-shoe arrangement is secured to the upper portion of the rotor adjacent the intake 2, and it includes a permanent magnet 10 arranged within a pole piece of ferromagnetic material which has inwardly axially extending circular knife edges 9 which are axially spaced from and oppose circular knife edges 8 which extend in an opposite direction from the end of the rotor shaft 6. The fixed pole-shoe arrangement includes the permanent magnet 10 and the knife edges 9 and they form together the upper passive bearing which effects the centering of the rotor due to the geometry of the annular pole-shoes and which also exerts an axial pull of the rotor.

A similar arrangement with circular knife edges 11 and 12 and magnets 13 is provided at the opposite or lower end of the rotor and they form a second passive bearing also centering and exerting an axial pull on the rotor.

At the inner or exhaust end of the pumping system, the rotor also carries a magnet arrangement 15 accommodated in a yoke 14 and produces a radial magnetic field in a cylindrical air gap 16 which is coaxial of the rotor shaft 6. In this air gap, a cylindrical fixed coil 17 is positioned, which forms an electrodynamic system by which exclusively axial forces are exerted on the rotor. These axial forces, and hence, the positioning of the rotor, are controlled through a sensor 18. When sensor 18 is effective, current flows through coil 17 in a selected direction to produce an axial pulling or pushing force depending on the direction of current which is transmitted by the sensor. In the present design of the passive bearings, there exists a position of the rotor in which the axial forces which act on the rotor are compensated by the forces exerted by the passive bearings including the force of gravity. In other words, the rotor occupies a position at the point of labile equilibrium and, as soon as the rotor migrates out of this position, it is attracted by the passive bearing located in the direction of migration. By means of the sensor 18 for the axial position of the rotor, the electromagnetic system is controlled so that upon a deviation of the rotor from the point of labile equilibrium, the system counteracts the motion.

In order to eliminate axial oscillations of the rotor, the electrodynamic system may also be controlled by damping means which may be produced by electronic devices or by additional sensors which determine the velocity of the oscillation. Radial motions, for example, precession movements of the rotor, are damped by the described provision of ferromagnetic sections on the rotor, since upon a radial deviation of the ferromagnetic pole-shoe from the field of the fixed permanent magnet, eddy currents are induced which dampen this motion. For a more intense damping of the radial movements, additional damping elements 19 may be provided which are controlled through corresponding sensors.

This design of the mounting also permits an operation of the pump with a horizontally extending rotor provided that the permanent magnets of the passive bearings are correspondingly strong to enable the centering parts to carry the weight of the rotor.

In order to prevent contacts of the rotor and the stator, radial and axial stops may be advantageously provided which permit only limited deviations of the rotor and which act at a failure of the magnetic suspension as emergency bearings in which the rotor can run down.

In the embodiment of the invention illustrated, the conical bearing bushes 20 and 21 act as stops both in the radial and axial directions.

The magnetic arrangement of the electrodynamic system which produces the radial magnetic field is secured to the inner surface of the pot-shape yoke 14. The yoke 14 is connected to the rotor and it is provided with a central core pin 22 which engages within the conical recess of the bearing bush 20. Permanent magnet 15 includes a plurality of individual magnets in the magnetic arrangement and this has the advantage that the magnets are pressed against the wall by centrifugal force. Yoke 14 is enlarged at its bottom where it accommodates a magnet arrangement 23 of a DC motor, which is of a known kind and which does not have a commutator. The motor includes an iron-free winding in order to avoid radial forces which could be exerted by the motor on the rotor of the pump. The winding pack 24 of the drive motor and the coil 17 of the electrodynamic system are combined in a subassembly which can be removed from the casing of the pump in an assembled state. In this subassembly, for example, the sensors 18 for the axial and radial positioning of the rotor and the effective controls and damping devices associated therewith are provided.

While a specific embodiment of the invention has been shown and described in detail to illustrate the application of the principles of the invention, it will be understood that the invention may be embodied otherwise without departing from such principles.

What is claimed is:

1. A turbo vacuum pump, comprising a cylindrical casing having an intake adjacent one end and an exhaust adjacent an opposite end of said casing, a stator mounted in said cylindrical casing, a rotor arranged within said casing, first rotor mounting means for the radial mounting of said rotor, second rotor mounting means for the axial mounting of said rotor, said second rotor mounting means for the axial mounting comprising an electrodynamic system disposed adjacent said exhaust and including a permanent magnet arrangement which is secured to said rotor and which produces a substantially radial field, and a coil arranged concentrically in respect to said rotor and immersed in said permanent magnet arrangement, said first rotor mounting means comprising at least one permanent magnet arrangement which is fixed to the casing and said rotor has a magnetic portion axially aligned and oppositely facing said permanent magnetic arrangement.

2. A turbo vacuum pump, comprising a cylindrical casing having an intake adjacent one end and an exhaust adjacent an opposite end of said casing, a stator mounted in said cylindrical casing, a rotor arranged within said casing, first rotor mounting means for the radial mounting of said rotor comprising at least one permanent magnet arrangement which is fixed to the casing and said rotor has a magnetic portion axially aligned and oppositely facing said permanent magnetic arrangement, second rotor mounting means for the axial mounting of said rotor, said second rotor mounting means for the axial mounting comprising an electrodynamic system disposed adjacent said exhaust and including a permanent magnet arrangement which is secured to said rotor and which produced a substantially radial field, and a coil arranged concentrically in respect to said rotor and immersed in said permanent magnet arrangement, and an electro-motor mounted within said casing and having a stator encompassing said coil forming a subassembly with said coil which may be mounted and dismounted from said pump casing in an assembled state without interfering with said rotor.

3. A turbo vacuum pump, comprising a cylindrical casing having an intake adjacent one end and an exhaust adjacent an opposite end of said casing, a stator mounted in said cylindrical casing, a rotor arranged within said casing, first rotor mounting means for the radial mounting of said rotor comprising at least one permanent magnet arrangement which is fixed to the casing and said rotor has a magnetic portion axially aligned and oppositely facing said permanent magnetic arrangement, second rotor mounting means for the axial mounting of said rotor, said second rotor mounting means for the axial mounting comprising an electrodynamic system disposed adjacent said exhaust and including a permanent magnet arrangement which is secured to said rotor and which produces a substantially radial field, and a coil arranged concentrically in respect to said rotor and immersed in said permanent magnet arrangement, said permanent magnet arrangement producing a magnetic field of the electrodynamic system, said rotor having a pot-shape yoke with a central core pin positioned within said second rotor mounting means, said magnetic arrangement being located within said yoke.

4. A turbo vacuum pump, according to claim 3, including a commutatorless motor having a motor rotor equipped with permanent magnets, said motor rotor being an outside rotor which is mechanically connected to said pot-shape yoke and carrying said permanent magnets at its interior.

5. A turbo vacuum pump, comprising a housing having an intake adjacent one end and an exhaust spaced from said intake and adjacent the opposite end of said casing, first and second axially spaced bearing means in said housing, a pump rotor having respective ends operatively engaged with respective first and second bearing means, first magnetic means acting on said rotor for stabilizing said rotor axially in respect to said first and second bearing means, and second magnetic means acting on said rotor for stabilizing said rotor radially in respect to said first and second bearing means, wherein each of said first and second bearing means comprises a bearing bush having a conical recess, said rotor having a pin adjacent each end engageable in respective conical recesses, said rotor having a plurality or rotor wheels, said casing including a pump stator having a plurality of guide wheels cooperating with said rotor wheels, said rotor including a yoke portion defining an annular hollow space, said first magnetic means comprising a plurality of permanent magnets arranged in said hollow space around said rotor, an energizing coil arranged in said hollow space, and sensor means connected to said energizing coil for actuating said coil to shift said rotor axially in order to position it in an axially centered equilibrium.

6. A turbo vacuum pump, according to claim 5, wherein said second magnetic means comprises a permanent magnet adjacent said intake end of said housing, a pole piece surrounding said magnet and terminating in at least one annular pole-shoe, said rotor having a pole-shoe edge opposite to said pole-shoe.

7. A turbo vacuum pump, according to claim 6, wherein said pole-shoe includes two concentrically arranged annular pole-shoe edges of different diameter opposite to two concentrically arranged pole-shoe edges of said rotor.

8. A turbo-vacuum pump, according to claim 7, wherein said first magnetic means includes a permanent magnet adjacent the opposite end of said rotor from said intake and having a pole piece with an annular pole piece knife edge, said rotor having a pole piece knife edge disposed in opposition to the pole piece knife edge of said permanent magnet of said opposite end.

* * * * *